United States Patent [19]  
Hertz

[11] 3,866,332  
[45] Feb. 18, 1975

[54] FLUIDIZED BED DRYER
[75] Inventor: Gerald Hertz, Pennside, Pa.
[73] Assignee: Crompton & Knowles Corporation, Worcester, Mass.
[22] Filed: June 6, 1972
[21] Appl. No.: 260,156

[52] U.S. Cl................ 34/57 A, 34/10, 159/DIG. 3
[51] Int. Cl......................... F26b 17/10, F26b 3/08
[58] Field of Search.......... 34/10, 57 R, 57 A, 57 D; 159/4 A, 4 CC, 4 VM, DIG. 3

[56] References Cited
UNITED STATES PATENTS

| | | |
|---|---|---|
| 2,654,659 | 10/1953 | Friedman........................... 34/10 X |
| 2,774,661 | 12/1966 | Waite................... 423/148 |
| 3,216,125 | 11/1965 | Dennert................. 34/10 |
| 3,261,661 | 7/1966 | Javorsky et al......... 34/10 |
| 3,662,474 | 5/1972 | Huthwaite............... 34/9 |

Primary Examiner—Charles J. Myhre
Assistant Examiner—William C. Anderson

[57] ABSTRACT

A dryer having a bed of inert thermally stable particles, means to introduce material to be dried in the bed and a heated gas from beneath the bed to "fluidize" the bed, and a screen located above the bed to restrain bed particles and allow "pieces" of dried material to pass therethrough.

1 Claim, 2 Drawing Figures

FLUIDIZED BED DRYER

BACKGROUND OF THE INVENTION

This invention relates to a fluidized bed drying apparatus for materials which may be in the form of pastes, slurries or solutions and is particularly useful for dye compositions.

So called "fluidized bed dryers" are known wherein a bed of inert, thermally stable particles which are contained from beneath in the drying chamber by a gas-permeable support. A heated gas is introduced through the support at sufficient velocity to agitate the particles so that the bed of particles appears as a boiling liquid. By "inert thermally stable particles" is meant particles which under the influence of the drying heat do not decompose or react with the gas used for drying, or with the materials to be dried.

The paste, slurry, or solution to be dried is introduced into the fluidized bed whereupon it coats the inert bed particles. The material is then dried by the transfer of heat from the gas and the inert particles to the coating. The turbulent action of the bed maintains a constant drying temperature while the material to be dried is constantly agitated to insure greater drying efficiency. As the material dries, individual "pieces" thereof break off the inert particles in the course of the many violent collisions of the inert particles among themselves and with the drying chamber walls. The "pieces" of dried material are then carried out of the dryer by the drying gasses and collected as the product.

There are several problems inherent in this type of dryer which heretofore have not been readily correctable.

In operating a fluidized bed dryer of this type the bed particles are in a violently agitated, turbulent condition due to the fluidizing drying gas. This turbulent action is not uniform across the entire cross-section of the bed. There are at times localized areas of increased turbulence amongst the bed particles. Because of this increased turbulence, some of the inert bed particles, coated or not, are given sufficient vertical velocity to carry them to the dryer outlet, which is generally a constriction wherein the gas velocity is high enough to entrain them and they end up with the product.

A combination of design factors can be employed in an attempt to minimize this carryover problem; however, no complete solution has heretofore been put forth.

One probable solution is to increase the size or density of the inert bed particles but this reduces drying efficiency.

If the size or density of the inert particles are maintained relatively small for greater drying efficiency, increasing the dryer height above the bed will compensate somewhat for closeness between entrainment velocities of product pieces and inert particles, but this measure rapidly becomes wasteful of space, heat, and fabrication materials as the dryer becomes very large.

In drying some materials, the ratio of the thickness of coating on the inert particles to the uncoated radius of these inert particles themselves increases enough to reduce the weight/projected surface ratio of these thickly coated particles to a level which permits their entrainment even though the gas velocity is too low to entrain uncoated or thinly coated inert particles.

The turbulence of the bed causes occasional inert particles to be "thrown" up high enough to be entrained by the higher gas velocity existing at the dryer outlet. It would therefore seem desirable to minimize turbulence in order to minimize inert particle entrainment. However, decreased turbulence lowers the frequency and force of the collisions of the inert bed particles among themselves and between them and the drying chamber walls, causing both agglomeration within the bed of the material being dried and accumulations on the drying chamber walls.

Fluidized bed driers of this type are characterized by two major factors which can limit the drying rate and efficiency:

1. the kinetics of the drying process; and
2. the kinetics of attrition or "breaking" of the dry material from the inert bed particles.

The kinetics of the drying process are characteristic of the material being dried and therefore are somewhat independent of the design of a dryer of this type. Materials being dried, if they are fluid, do not necessarily change directly to the solid state when their liquid content reaches a given low level. Some materials pass through a transitional physical condition in which they are viscous, plastic, and strongly adhesive. The range of liquid contents at which these materials exist in this transition state and the evaporation rate while in this condition are both characteristic of the material itself, thus strongly influencing the residence time required to achieve the desired degree of dryness.

If a material dries faster than it can break off the inert particles, it will begin accumulating within the apparatus. The kinetics of attrition, rather than the kinetics of drying, will then be rate-determining, i.e. the slowest step in the overall process will be removal of accumulated product coating the particles and the walls. The rate of attrition is largely determined by the force and frequency of the inter-particle and particle/wall collisions, both of which are functions of the bed turbulence, (and therefore the gas velocity). Hence a certain degree of turbulence is mandatory for the minimization of the limits imposed by attrition kinetics on the dryer operation rate.

SUMMARY OF THE INVENTION

It is a principal objective of the invention to provide a fluidized bed dryer which will achieve greater drying capabilities with respect to the drying of pastes, slurries and solutions than known fluid bed dryers and to avoid the entrainment and rate limitations discussed above that would be encountered in this type of dryer.

The object of the invention is accomplished by providing a screen over the fluidized bed of such a mesh as to permit the passage of dried pieces of product and to restraining the passage of the inert thermally stable particles which make up the bed.

Because the screen over the fluidized bed prevents expulsion of the inert bed material, appreciably greater drying gas velocities are possible for a drying chamber of a given diameter and height.

Increasing the drying gas velocity increases the mass flow rates of the drying gas, raising the heat input to the dryer. Higher heat input increases drying capacity for a drying unit of a given size.

Another major advantage of increased velocities of the drying gas is more turbulent agitation of the inert fluidized bed particles. More turbulence increases the frequency and force of collisions among the inert bed particles and between them and the drying chamber walls and the upper screen.

Frequent and forceful collisions prevent the agglomeration of particles of the material being dried within the bed and the accumulation of either partially dried material on the chamber walls or product on the screen.

The screen must be placed sufficiently close to the bed that collisions of the inert particles with it will keep the passages of the screen open.

DETAILED DESCRIPTION

Figure 1:
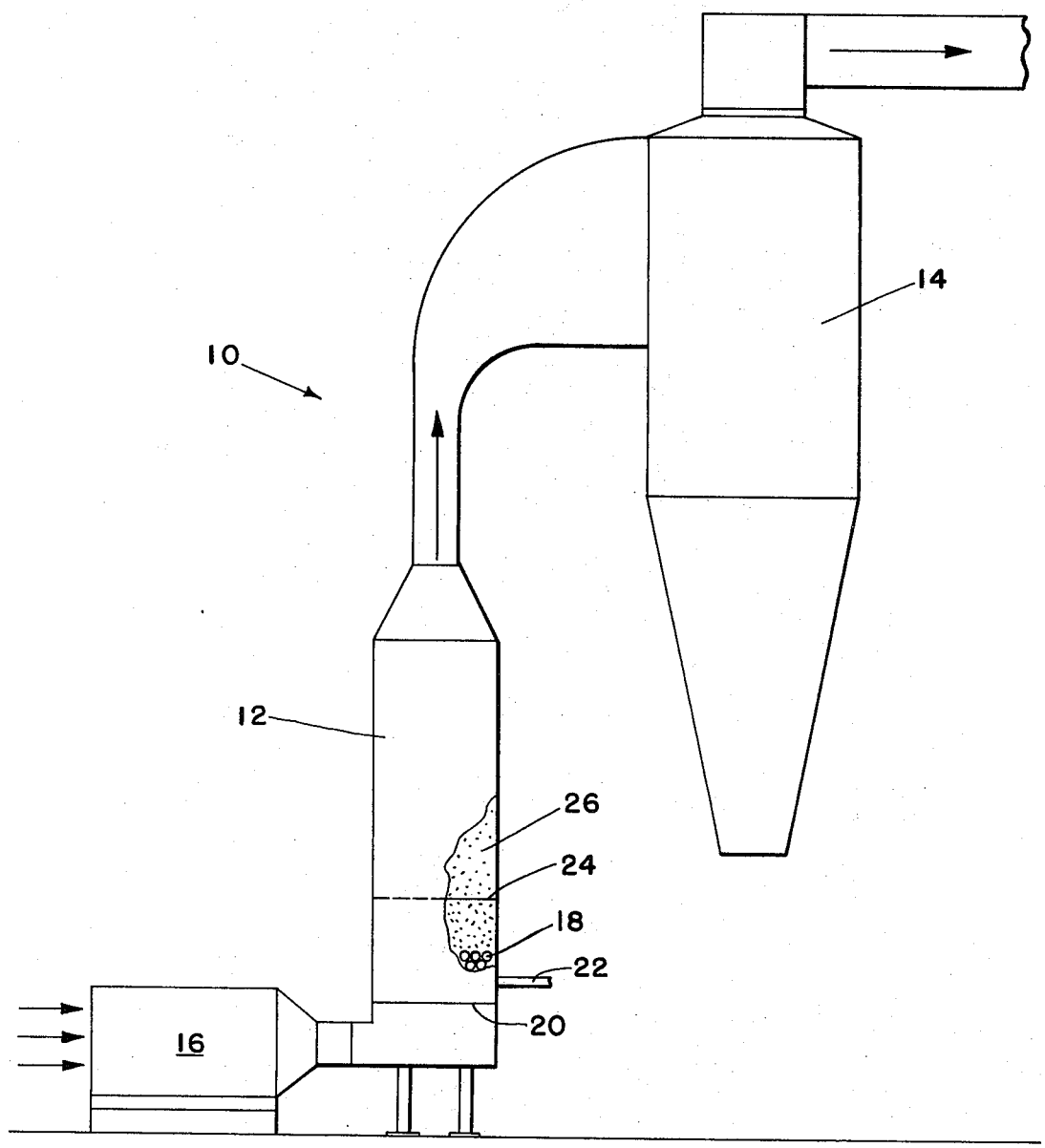
FIG. 1 is a diagrammatic illustration of a fluidized bed dryer in accordance with the present invention, parts being broken away.

Referring to the Figures, the dryer of the present invention is generally indicated by the reference number 10 and includes a drying chamber (12), a collection chamber (14) and a gas heater (16).

A bed of inert thermally stable particles (18) is located at the lower portion of chamber (12) and is supported on a gas permeable support such as a grid or perforated plate (20). A heated gas such as air is supplied from heater (16) and is forced up through plate (20) by conventional pneumatic means, not shown. The gas heats the bed of particles (18) and agitates it to a fluidized state. The material to be dried is introduced into the fluidized bed of particles (18) through a feed pipe (22). A screen (24) is located above the bed of solids (18) and has a mesh large enough to let dried pieces of product through but small enough to prevent particles (18) from passing therethrough. The air from heater (16) is forced through plate (20) at a velocity sufficiently high to fluidize the bed of solids (18) and to drive the dried product pieces upwardly through the screen (24) and into collection chamber (14). The product pieces and finer than the particles (18) and are indicated by the reference number 26.

Figure 2:
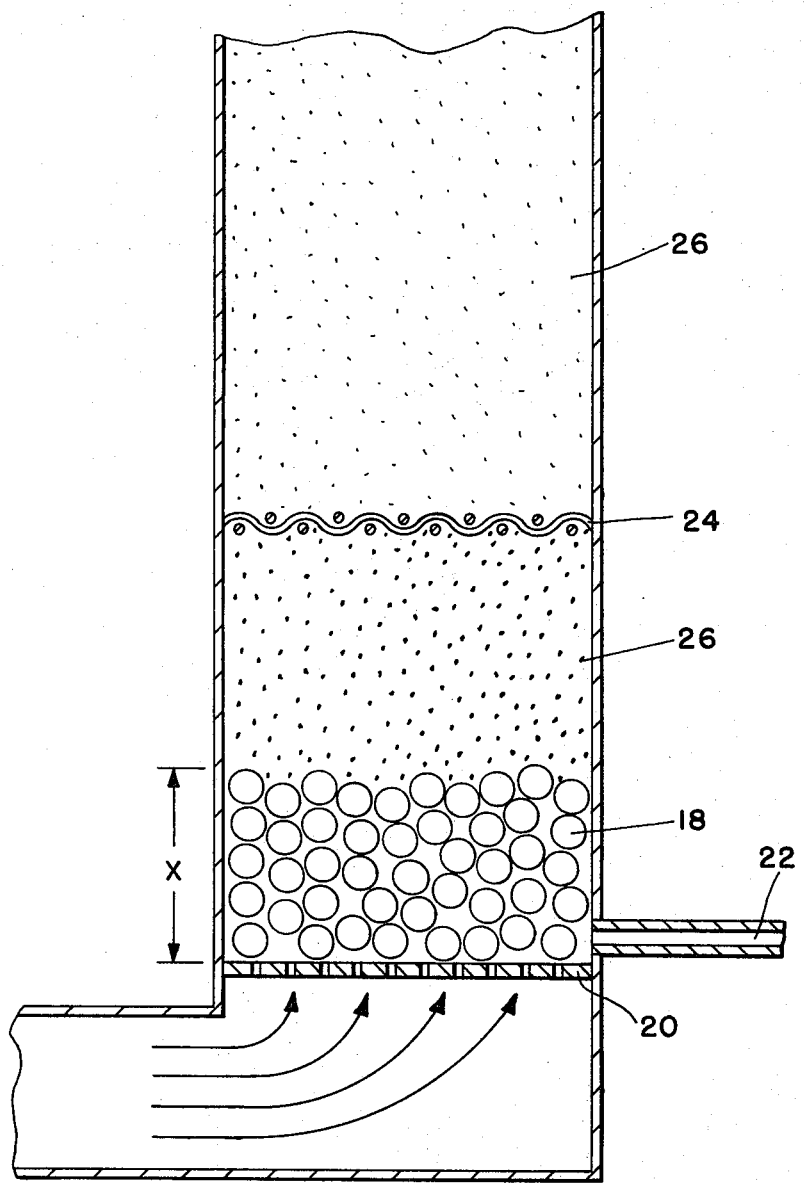
FIG. 2 is an enlarged section of the fluidized bed and drying chamber of FIG. 1.

It has been found that the effective range of screen position from the bed is between a distance equal to the vertical thickness of the bed in the unfluidized state to a distance six times such a thickness. The bed thickness is indicated by the reference $x$ in FIG. 2. If the screen (24) is spaced from the bed at a distance less than one bed thickness, the bed particles (18) are pinned against the screen (24) by the drying gas. If the screen (24) is spaced from the bed at a distance greater than six bed thicknesses ($x$), the frequency and force of collisions of the inert bed particles (18) against the screen (24) is sufficiently reduced to permit a buildup of die material on the screen which reduces the air flow below that necessary for fluidization, therefore, causing the drying process to stop. The exact optimum position of the screen (24) in this range will depend on the characteristics of the material to be dried and in velocity of the drying gasses.

What is claimed is:

1. Apparatus for drying particulate material comprising:
   a. a chamber;
   b. a gas permeable support at the lower portion of said chamber;
   c. a bed of inert thermally stable particles on said gas permeable support;
   d. means to introduce said particulate material to be dried into said bed;
   e. a screen located above said bed in a position to intercept and retain said bed of inert particles, said screen having a mesh small enough to prevent said inert particles from passing therethrough but large enough to allow dried particulate material to pass therethrough, and said screen being located from said bed a distance at least equal to the depth of said bed but not greater than six times its depth, whereby particulate material adhering to said inert particles or to said screen is dislodged therefrom upon the impingement of said inert particles with said screen.
   f. means to introduce a heated gas into said bed from beneath said support at a velocity sufficient to fluidize said inert particles and to blow dried pieces of said material through said screen; and
   g. means to collect said dried pieces.

* * * * *